(12) United States Patent
Henry et al.

(10) Patent No.: US 8,746,137 B1
(45) Date of Patent: Jun. 10, 2014

(54) CALIBRATION OF BALER TAILGATE CYCLE SPEED

(71) Applicant: CNH Canada, Ltd., Saskatoon (CA)

(72) Inventors: James W. Henry, Saskatoon (CA); Riccardo Morselli, Modena (IT); Kevin M. Smith, Narvon, PA (US); Mark Wileniec, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 0 days.

(21) Appl. No.: 13/841,999

(22) Filed: Mar. 15, 2013

(51) Int. Cl.
*A01F 15/00* (2006.01)
*A01F 15/07* (2006.01)
*A01F 15/08* (2006.01)

(52) U.S. Cl.
USPC ......... 100/35; 100/7; 100/45; 100/48; 100/88

(58) Field of Classification Search
CPC ........ A01F 15/085; A01F 15/07; A01F 15/08
USPC ............... 100/4, 7, 35, 43, 45, 48, 87, 88, 89, 100/188 R; 56/341, 343
See application file for complete search history.

(56) References Cited

U.S. PATENT DOCUMENTS

| | | | |
|---|---|---|---|
| 1,979,569 A * | 11/1934 | Parvin | 318/265 |
| 3,748,840 A | 7/1973 | Kanengieter et al. | |
| 4,549,481 A | 10/1985 | Groeneveld et al. | |
| 4,674,403 A | 6/1987 | Bryant et al. | |
| 5,263,410 A | 11/1993 | Olin | |
| 5,557,510 A | 9/1996 | McIntyre et al. | |
| 5,581,976 A | 12/1996 | Underhill | |
| 5,622,104 A * | 4/1997 | Viesselmann et al. | 100/88 |
| 6,272,825 B1 | 8/2001 | Anderson et al. | |
| 6,295,797 B1 | 10/2001 | Naaktgeboren et al. | |
| 6,644,006 B1 | 11/2003 | Merritt et al. | |
| 6,675,561 B2 | 1/2004 | Davis et al. | |
| 6,688,092 B2 | 2/2004 | Anstey et al. | |
| 6,877,304 B1 | 4/2005 | Smith et al. | |
| 7,197,979 B2 | 4/2007 | Derscheid | |
| 7,404,355 B2 | 7/2008 | Viaud et al. | |
| 7,472,649 B1 * | 1/2009 | Derscheid et al. | 100/88 |
| 7,849,791 B2 | 12/2010 | Smith | |
| 7,918,158 B2 | 4/2011 | Viaud | |
| 7,937,923 B2 | 5/2011 | Biziorek | |
| 2005/0247215 A1 * | 11/2005 | Biziorek et al. | 100/87 |

* cited by examiner

*Primary Examiner* — Jimmy T Nguyen
(74) *Attorney, Agent, or Firm* — Patrick M. Sheldrake

(57) ABSTRACT

System information and parameters relating to a baler and equipment connected thereto are used to calibrate the speed of a tailgate of the baler. Calibration involves setting the time it takes to raise and lower the tailgate. The calibration timing is used to control the speed of the tailgate for faster and safer bale ejections to ensure the ejection configuration values are tuned to the dynamics of the baler tailgate and hydraulic power of the tractor.

18 Claims, 5 Drawing Sheets

US 8,746,137 B1

CALIBRATION OF BALER TAILGATE CYCLE SPEED

TECHNOLOGY FIELD

The present invention relates generally to bale ejection from a baler, and more particularly to a process for calibrating a speed of a baler tailgate to aid in the bale ejection.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales. When the bale has reached a desired size and/or density, a wrapping system wraps the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by raising a tailgate of the baler. The tailgate is then closed and the cycle repeated as necessary and desired to manage the field of cut crop material.

It is desirable to control the speed of the tailgate for faster and safer bale ejections. This document describes a calibration process that involves setting the time it takes to raise and lower the tailgate, which is used to control the speed of the tailgate.

SUMMARY

Embodiments of the present invention provide for calibrating a speed of a baler tailgate.

According to embodiments, a tailgate calibration is executed for controlling the speed of a tailgate for bale ejections from a baler, where the tailgate is moveable between a closed position and an open position. One or more controllers, coupled to the baler and configured to control movement of the tailgate, are configured to perform the calibration. The calibration includes inputting factors relating to flow rate and speed for opening and closing the tailgate to system nominal values; opening, based on an open command from an interface coupled to the one or more controllers, the tailgate until a stop command is received by the controller; closing, based on a closed command from the interface, the tailgate to the closed position; and storing an open time associated with a time taken to open the tailgate until the stop command is received and a closed time associated with a time taken to close the tailgate to the closed position.

In an embodiment, the factors relating to flow rate and speed for opening and closing the tailgate comprise one or more of: (i) a normal hydraulic flow rate for opening and a normal hydraulic flow rate for closing the tailgate; (ii) a baler tailgate opening speed factor and a baler tailgate closing speed factor; and (iii) a calibration hydraulic flow rate for opening and a calibration hydraulic flow rate for closing the tailgate.

According to an embodiment, the one or more controllers are further configured to, prior to opening the tailgate: set a tractor, connected to the baler, at operational levels; and verify the closure of the tailgate.

In an embodiment, the one or more controllers are further configured to initiate an open timer when the open command is received; and stop the open timer when the stop command is received. The one or more controllers determine the open time based on the open timer. In an additional embodiment, the one or more controllers are further configured to initiate a closed timer when the closed command is received; and stop the closed timer when the tailgate reaches the closed position. The one or more controllers determine the closed time based on the closed timer.

In an embodiment, after the stop command is received, the one or more controllers move the tailgate to a fully open position.

In an embodiment, the stop command is a command received from the interface. In another embodiment, the stop command is based on a determination from the one or more controllers that the tailgate has reached a predetermined open position.

According to an embodiment, the open time and the closed time are subsequently used by the one or more controllers to facilitate a bale ejection sequence.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Embodiments of the present invention relate to calibrating a speed of a baler tailgate to aid in the bale ejection process. Embodiments of the present invention are particularly well suited for, but in no way limited to, use with agricultural balers, such as round balers, for example.

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
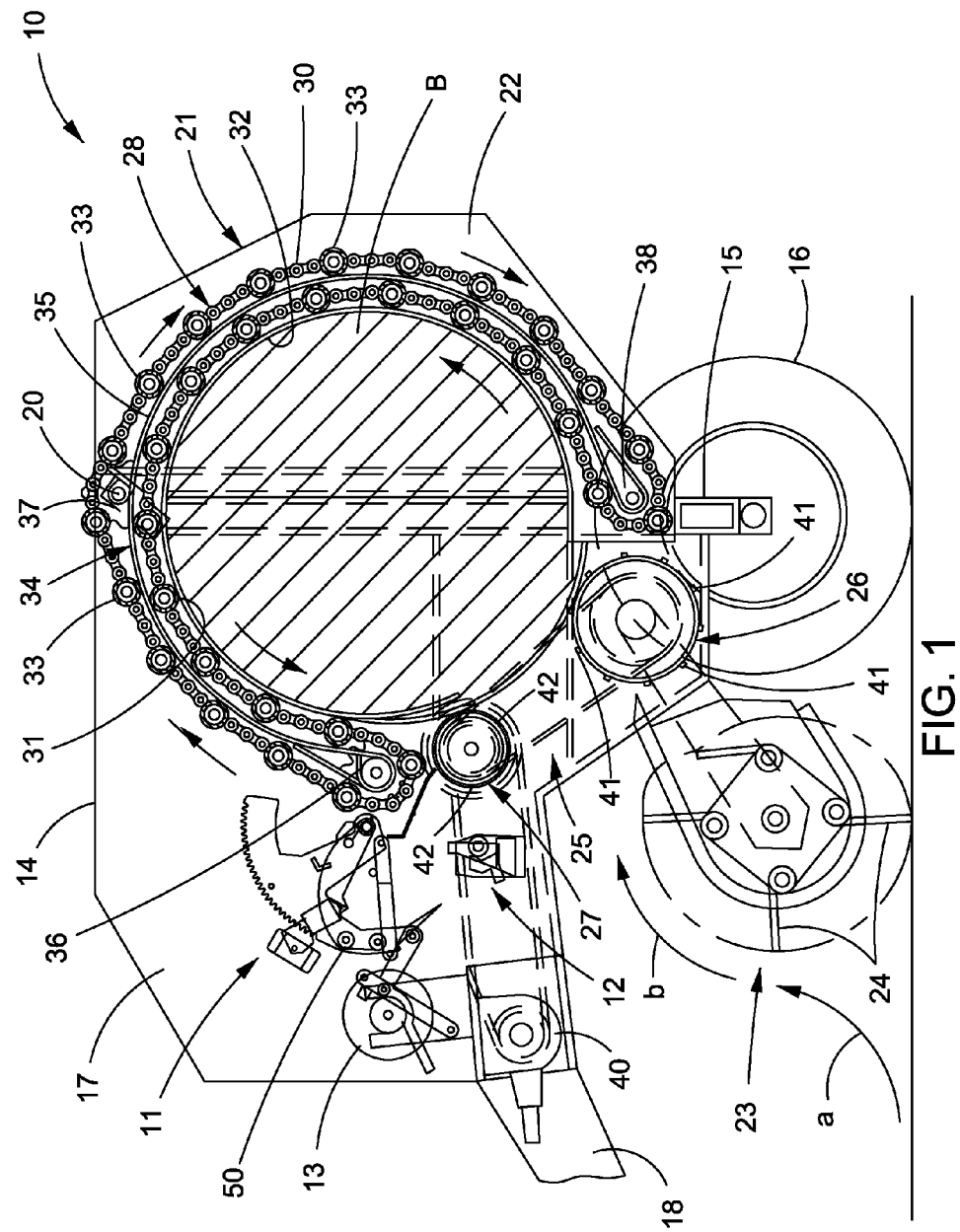
FIG. 1 is a cutaway side elevational view of an exemplary round baler in which the present invention may be employed.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (see tractor 100 in FIG. 2).

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed (as shown in FIG. 1) during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
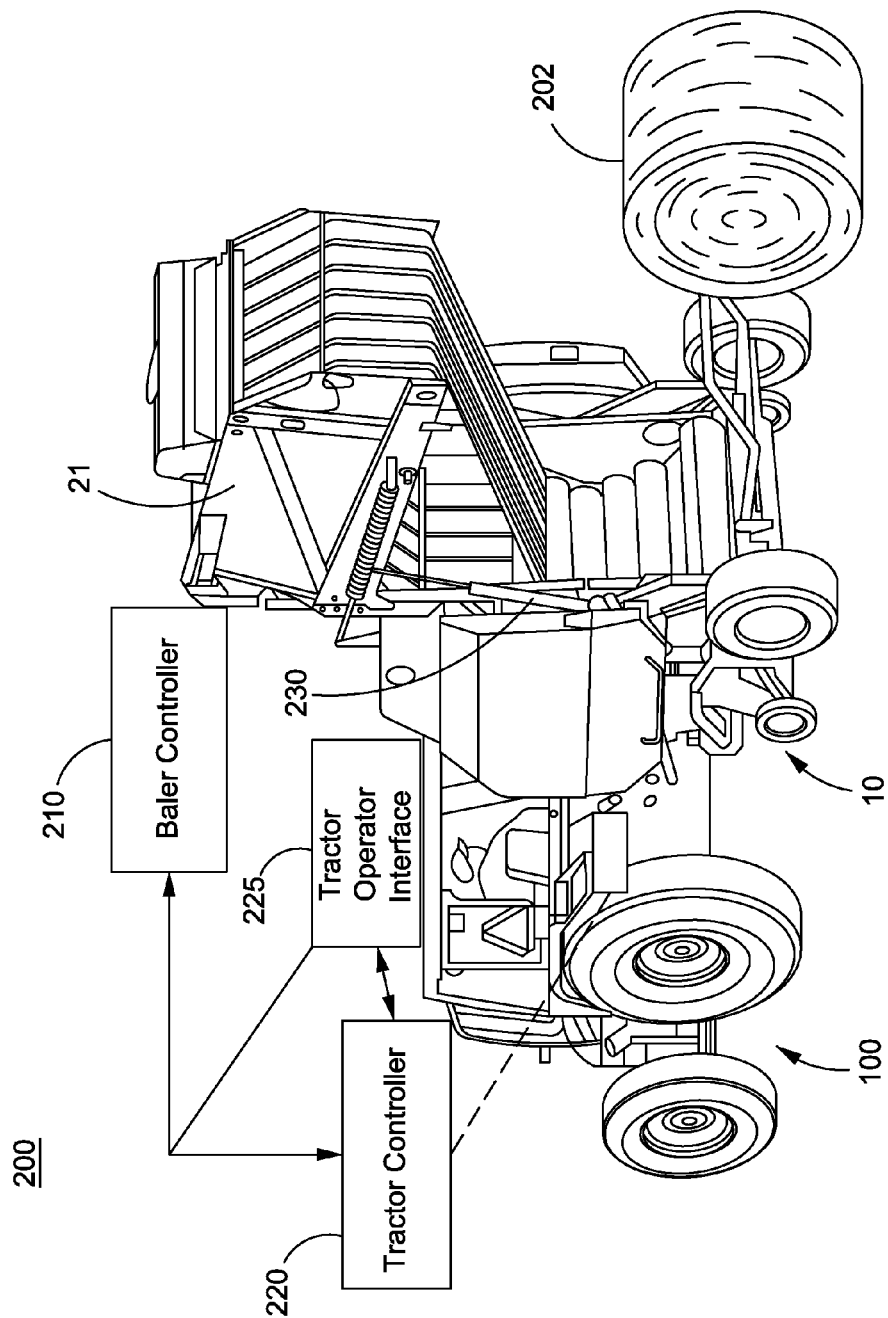
FIG. 2 illustrates a baling system including controllers for implementing a calibration process relating to a speed of a baler tailgate, according to embodiments.

FIG. 2 illustrates a baling system 200, according to embodiments, for performing a calibration relating to a speed of the baler tailgate 21. The baling system 200 includes the baler 10 with a baler controller 210 and the tractor 100 with a tractor controller 220 and a tractor operator interface 225 accessible by an operator in the tractor 100. The tractor operator interface 225 allows for the operator to see various control and status information as well as to enter and configure information for use by the tractor controller 220 and the baler controller 210. The tractor controller 220 and the baler controller 210 are coupled to one another for messaging and data communication. The tractor operator interface 225 is coupled to the tractor controller 220 and may be directly coupled to the baler controller 210 or indirectly through the tractor controller 220. In some embodiments, one controller may combine the functionality of the baler controller 210 and the tractor controller 220.

In other embodiments, the baler 10 is not connected to the tractor 100 but is connected to other equipment, such as, for example, a harvester or a part of a harvester, such as a cotton picker, or the like. In these embodiments, the other equipment (e.g., harvester) may include a controller, similar to the tractor controller 220, and an operator interface, similar to the tractor operator interface 225.

The baling system 200 is used to support the process of calibrating the speed of the baler tailgate 21, which aids in bale ejection. Proprietary or ISOBUS TECU Class 1 and 3 messaging is used between the tractor controller 220/the tractor operator interface 225 and the baler controller 210 to determine and request operations relating to calibration.

As shown in FIG. 2, the tailgate 21 is in an open position with the bale 202 ejected from the baler 10. In addition to the baler controller 210 and the components described above with reference to FIG. 1, the baler 10 also includes a hydraulic system 230 connected to the tailgate 21 to move the tailgate 21 between the closed position and the open position. The hydraulic system 230, according to an embodiment, may include an actuator and a flow valve. The baler controller 210 is connected to a flow valve to control a flow of fluid to the hydraulic system 230; by controlling a hydraulic flow rate of the fluid to the hydraulic system 230, the baler controller 210 controls opening and closing of the tailgate 21.

Figure 3A:
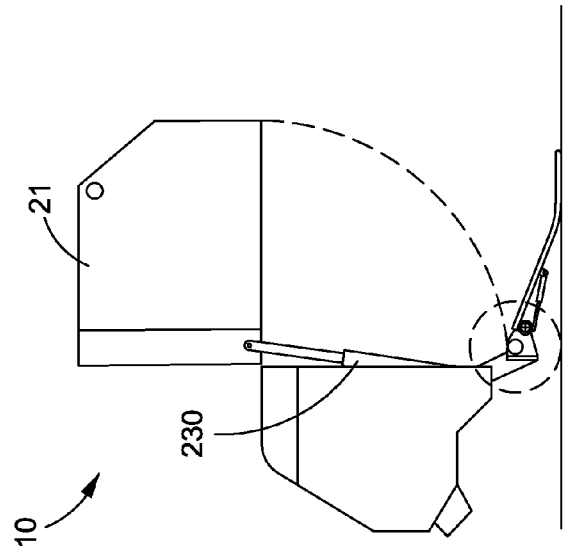
FIGS. 3A and 3B provide side views of a baler 10 with a tailgate in a near open position and in a fully open position, respectively.
Figure 3B:
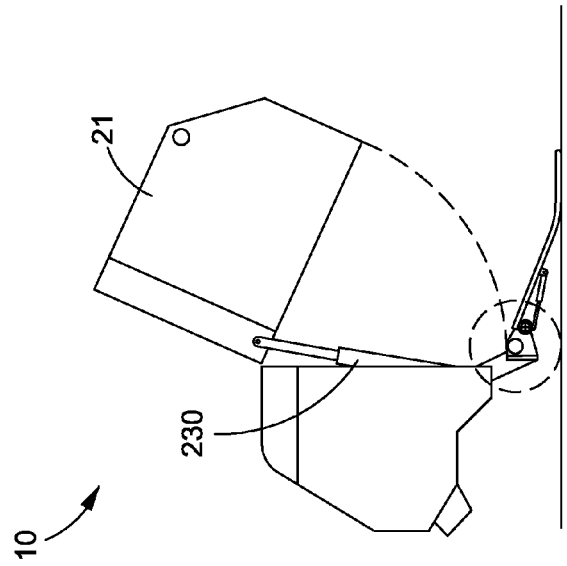

FIGS. 3A and 3B provide side views of the baler 10 (without the tractor 100 or other equipment connected to the baler 10) with the tailgate 21 in a near-top or near-open position and in a top or fully opened position, respectively, as used during the calibration process provided herein.

Figure 4A:
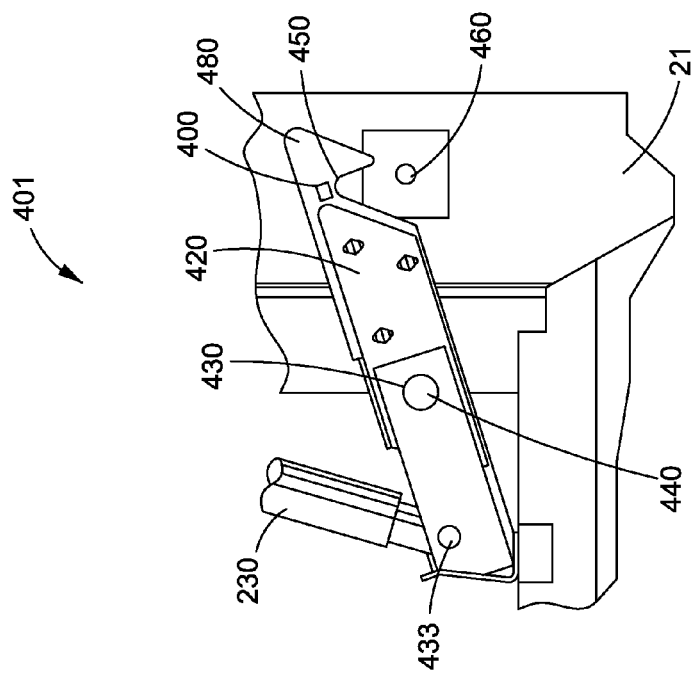
FIGS. 4A and 4B provide an example representation of a latching mechanism, used for detecting when the tailgate of a baler is closed, according to embodiments.
Figure 4B:
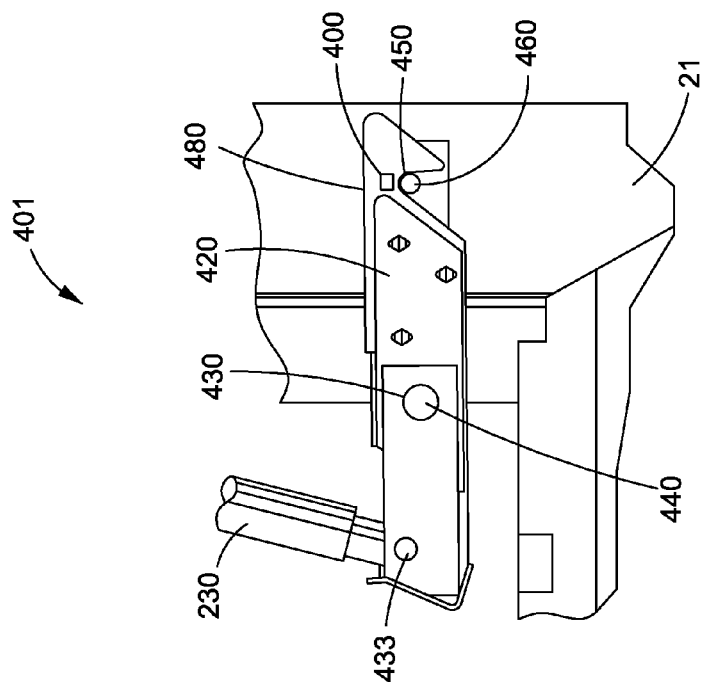

FIGS. 4A and 4B provide an example representation of a latching mechanism 401, used for detecting when the tailgate 21 is closed. The latching mechanism 401 includes a lever arm 420 pivotally coupled to the baler 10 by a pivot point 430 engaging a pivot pin 440 in a manner such that a portion of the lever arm 420 extends in opposing directions from the pivot point 430. One end of the lever arm 420 is pivotally coupled to the hydraulic system 230 using a pin 433. The opposite end of the lever arm 420 is connected to a catch plate 480 which includes an arcuate catch structure 450 featuring a hook-like structure for engaging a latch pin 460 mounted on the tailgate 21. As shown in FIG. 4A, the latching mechanism 401 is in the latched position as it would be during the closed baling chamber condition when the baler 10 is forming a bale 202. FIG. 4B shows the latching mechanism 401 in the unlatched position as it would be when the tailgate 21 is to be raised to discharge the bale 202. A gate closed sensor 400 is provided on the catch plate 480 and senses contact with the latch pin 460 when the tailgate 21 is closed. The gate closed sensor 400 is coupled to the baler controller 210 and accordingly transmits a signal when contact with the latch pin 460 is sensed.

The latching mechanism 401 with the gate closed sensor 400 is one type of mechanism that may be used to detect when the tailgate 21 is closed or at a bottom position; various other mechanisms and sensors may be used for such detections in accordance with the embodiments of the present invention. For example, in another embodiment, a sensor is used to indicate when the tailgate 21 reaches a bottom position. In this embodiment, a portion of the tailgate 21 comes into contact with the sensor when the bottom position is reached.

Now turning to the calibration operations, the baling system 200 uses system information and parameters relating to the tractor 100 (or other equipment) and the baler 10 to calibrate the speed of the tailgate 21. Calibration involves setting the time it takes to raise and lower the tailgate 21. The calibration timing is used to control the speed of the tailgate 21 for faster and safer bale ejections.

The purpose of the calibration is to ensure the ejection configuration values are tuned to the dynamics of the baler tailgate 21 and hydraulic power of the tractor 100 as the bale ejection sequence relies on a timed control of the tailgate 21 opening and closing. There are several factors that affect the timing of the tailgate 21 by the baler controller 210, including: engine RPM; dynamics of the tractor hydraulic system; target maximum hydraulic speed at opening; target maximum hydraulic speed at closing; inertia and momentum of the tailgate 21; and ejection push by the bale as it rolls out of the baler 10. These factors combine to require the careful calibration of the baler controller 210 timing to match the target ejection pattern for a given baler, tractor, and size of bale.

Calibration software running on the baler controller 210 uses various configuration inputs as well as operator actions. When the calibration process is initiated by the operator, an internal timer, controlled by the baler controller 210, for the tailgate opening process is started. The operator indicates that the tailgate 21 has reached a top position (by, for example, pressing a 'TOP' button or the like on the operator interface 225), the timer is stopped, and the value stored as "Baler Gate Up Time." The operator initiates a new timer for the closing of the tailgate 21 (by, for example, again pressing a 'TOP' button or the like on the operator interface 225). When the gate closed sensor 400 indicates a closed tailgate 21, the timer is stopped and the value stored as "Baler Gate Down Time."

Due to the dynamic nature of the bale ejection sequence, and the dependency on the tractor 100 and system factors mentioned above, a two stage calibration operation is implemented to ensure the tailgate actions are safe and appropriate. The two stages comprise a set-up stage, during which various controls and parameters are established, and a calibration operation run stage, during which the tailgate 21 is moved to a top position and then to a closed position as briefly described above with respect to the timers and as more fully described below.

Calibration is based on the following dynamics: (1) using the operational target engine RPM (i.e., engine RPM when normally baling): Since a baler 10 can typically only command a percentage of hydraulic flow rates, it is important that the calibration is done at the operational engine RPM; (2) accounting for the tailgate momentum at the top of the opening stage: When running at the tailgate opening maximum rate, the tailgate 21 has additional momentum, above what is measured during calibration; thus, during the calibration of the tailgate opening, the operator should select a tailgate open stop position somewhat earlier than would be needed during bale ejection operations; and (3) encompassing the full close cycle from the target full open position: Because of the opening momentum adjustment mentioned above, the opening calibration step leaves the tailgate 21 short of the target open position; thus, the tailgate 21 must be moved to the target tailgate full open position before performing the lower calibration so the proper timing values are captured.

The operator of the baler 10/tractor 100 is presented with a calibration interface via the tractor operator interface 225 to perform calibration of the tailgate 21. During the calibration sequence, the operator is asked to enter the following parameters in a setup screen on the tractor operator interface 225: target maximum hydraulic speed at opening and target maximum hydraulic speed at closing. This information is used to calculate anticipated tailgate opening and tailgate closing times for a bale ejection sequence.

One or more of the following set-up steps is performed before initiating the calibration operation stage: set the hydraulic channel configuration item to match the hydraulic remote on the tractor 100 that controls the tailgate 21; set the normal hydraulic flow rate for opening and normal hydraulic flow rate for closing to system nominal target rates; set the baler tailgate opening speed factor and baler tailgate closing speed factor to system nominal values; set the calibration hydraulic flow rate for opening and calibration hydraulic flow rate for closing to system nominal calibration rates; ensure the baler gate ejection control is not enabled; bring the tractor engine RPM to operational levels; ensure the tailgate 21 is in the fully closed/latched position; ensure that the tractor's hydraulic extend and retract directions on the remote correspond to opening and closing the tailgate 21 respectively; and engage the tractor 100 for implement control. The term "system nominal" as used herein indicates those values which are normal for a specific combination of tractor 100 and baler 10. The determination of the appropriate system nominal values may be required on a per tractor/baler combination.

The baler controller 210 and/or the tractor controller 220 may perform one or more of the set-up steps and may verify that each of the above criteria are satisfied. Moreover, the baler controller 210 and/or the tractor controller 220 may complement this process by providing, via the operator interface 225, a corresponding indication to the operator. For example, the controllers 210/220 may refer to stored system nominal values and set one or more of the various parameters to the corresponding system nominal values. As another example, the baler controller 210 may ensure the tailgate 21 is in the fully closed/latched position by monitoring a signal received by the gate closed sensor 400. The baler controller 210 and/or the tractor controller 220 may prevent the subsequent stage of calibration operation run from occurring if one or more of the set-up steps is not completed or satisfactorily established.

After the set-up stage is complete, an operator uses the operator interface 225 to initiate a calibration operation run. The tailgate 21 is opened, via the baler controller 210, at the rate set for calibration hydraulic flow rate. The operator uses an operator input, via the operator interface 225, to stop the opening of the tailgate 21 at a position short of the fully desired open position. As indicated above, this position is affected by the additional momentum on the tailgate 21 when opening at the normal hydraulic flow rate for opening. The operator gauges and adjusts this position as necessary for a system nominal position. Next, the tractor 100 is disengaged for implement control and the tailgate 21 is moved to the desired fully open position. Once the fully open position is reached, the tractor 100 is reengaged for implement control. The operator uses an operator input, via the operator interface 225, to initiate the closing calibration phase. The baler 10 will automatically stop calibration at the closure of the tailgate 21. As described above, during this operation, the "Baler Gate Up Time" and the "Baler Gate Down Time" are captured. These values may subsequently be used for a bale ejection sequence.

In a preferred embodiment, once a calibration operation run is complete, the operator confirms the operational dynamics. This is accomplished by, using operational controls on the baler 10, initiating a normal bale ejection sequence to confirm the timing operations including the operation, opening speed, slowdown, fully open position, closing speed, slowdown, and gate latch engagement. If the sequence is not satisfactory (e.g., opening 'bangs' at the top of the baler 10 or other observable issues), then the operator may adjust the calibration settings identified above to try and tweak the sequence. Once the operator is satisfied with the calibration, aggression and stopping rate factors may be adjusted via the operator interface 225 to fine tune the closing speed and engagement as desired. Aggression refers to how quickly the tailgate drop will be brought to a slow speed; in some embodiments, a lower value of aggression provides a slower and smoother slowdown of the tailgate 21, while a higher value makes for a more abrupt slowdown. Stopping rate controls the closure hydraulic rate used to positively engage the tailgate latch at the end of the bale ejection sequence (i.e., when the tailgate 21 is closed, the hydraulic flow rate will not drop below this level until the tail gate latch sensor indicates that the tail gate is positively engaged). The stopping rate value also controls the hydraulic rate used during the tailgate drop calibration step.

In one embodiment, the controller 210 is programmed to calculate using an algorithm the flow rates required to achieve at least two different speeds and the transition between the two speeds during both raising and lowering operations. The controller 210 is further programmed to determine the point at which the tailgate 21 transitions between the first and second speed. The point or time at which the transition occurs is determined by an algorithm as a function of the travel time of the baler 10 between a closed an open position determined during calibration and the operator inputted aggression factor. A less aggressive setting will cause the transition between the first and second speeds to occur sooner than a more aggressive setting while a more aggressive setting will cause the transition between speeds to occur more closely to the extent of the travel.

As described above with respect to the calibration operation, the controller 210 is programmed to calculate the speed between an open position and a closed tailgate position. Algorithm software aims to reduce the flow rate in a near open position and a near closed position, which reduces the acceleration of the mechanical tailgate components, thereby reducing the stress on the mechanical tailgate components, such as cylinders or latching mechanisms. This aggression factor may be based on a fixed flow rate, or calculated based on desired reduction in flow. With a linear rate, the flow rate is slowly reduced to near zero; in a quadratic fashion the flow rate progressively reduces to near zero. This allows the operator to pick the aggression factor.

In another embodiment both the transition time and change in flow can be calculated by the controller 210 as a function of the overall time and the aggression factor.

Figure 5:
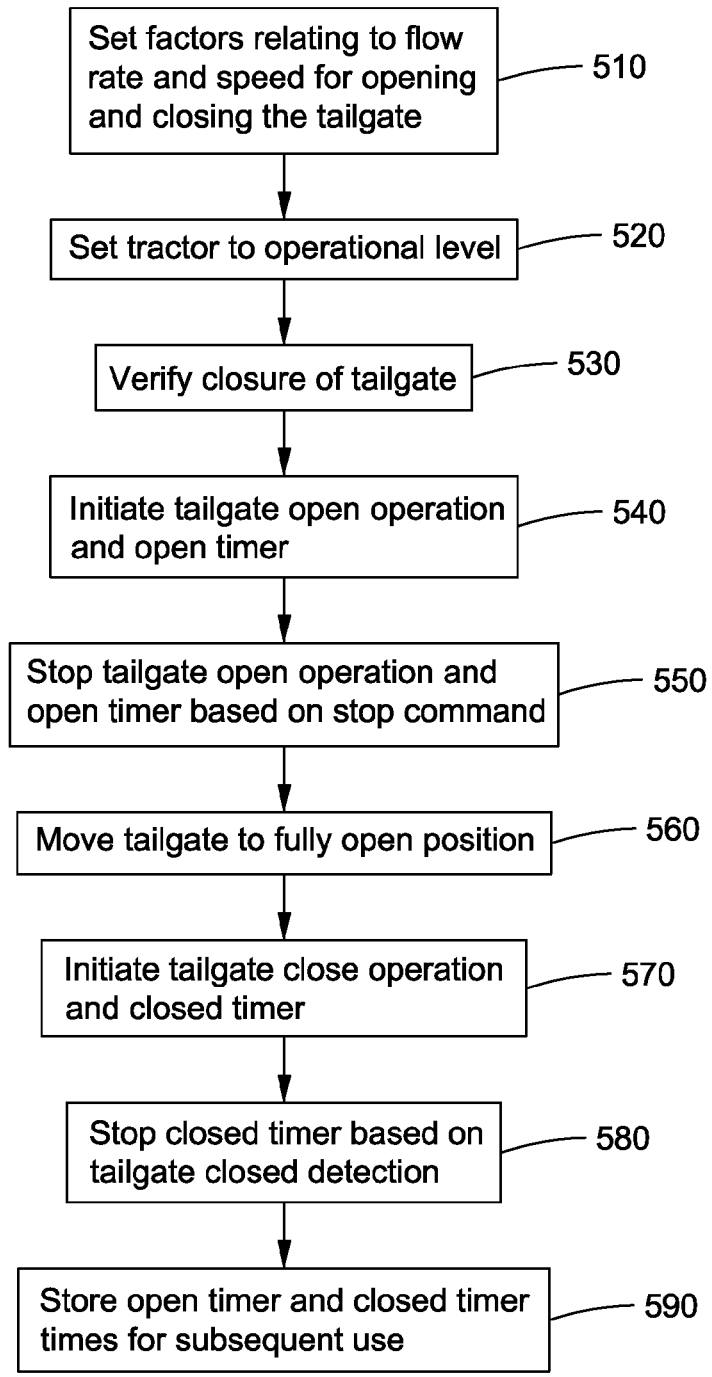
FIG. 5 is a flowchart illustrating a method of calibrating a speed of a baler tailgate, according to embodiments.

FIG. 5 is a flowchart illustrating a method 500 of a tailgate calibration operation, according to an embodiment. At 510, factors relating to flow rate and speed for opening and closing the tailgate are set to the system nominal levels. The factors may include, for example, the normal hydraulic flow rate for opening and normal hydraulic flow rate for closing; the baler tailgate opening speed factor and baler tailgate closing speed factor; the calibration hydraulic flow rate for opening and calibration hydraulic flow rate for closing.

At 520, the tractor 100 is set to the operational level. In particular, the tractor engine RPM is brought to operational levels.

At 530, the closure of the tailgate 21 is verified. The verification may be achieved by the baler controller 210 monitoring a signal received by the gate closed sensor 400 as described above with respect to FIGS. 4A and 4B.

Upon the setting of the factors to the system nominal levels, the tractor being set to the operational level, and the tailgate 21 being verified as closed, an operator may use the operator interface 225 to initiate a calibration operation run.

At 540, the tailgate open operation and open timer are initiated. The tailgate open operation may be initiated via a command from the operator using the operator interface 225.

At 550, based on a received stop command, the tailgate open operation and open timer are stopped. The stop command may be from the operator, via the operator interface, indicating that the tailgate 21 has reached a desired position short of the fully desired open position. Alternatively, the stop command may be based on a determination from the baler controller 210 that the tailgate 21 has reached a predetermined open position.

At 560, the tailgate 21 may be moved to a fully open position.

At 570, the tailgate close operation and closed timer are initiated based upon a respective closed command from the operator interface 225.

At 580, based on detection of the tailgate 21 being closed, the closed timer is stopped. The detection may be based on the baler controller 210 monitoring a signal received by the gate closed sensor 400.

At 590, the open timer and closed timer times are stored for subsequent use in a bale ejection sequence, for example.

The controllers 210 and 220 may be one or more processing devices, computing devices, processors, or the like for performing calculations and operations described herein. The controllers 210 and 220 interface with one another and the tractor operator interface 225, as well as with components of the baler 10 and the tractor 100, and may also interface with one or more memory devices (not shown) such as read only memory (ROM), random access memory (RAM), and one or more optional non-transitory memory devices such as, for example, an external or internal DVD drive, a CD ROM drive, a hard drive, flash memory, a USB drive, or the like. The memory devices may be configured to include individual files and/or one or more databases for storing any software modules, instructions, or data.

Program instructions, software, or interactive modules for performing any of the functional steps associated with the processes as described above may be stored in the ROM and/or the RAM. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface may permit information from the controllers 210 and 220 to be displayed on the tractor operator interface 225, as well as other displays such as remote displays, in audio, visual, graphic, and/or alphanumeric format. Communication with external devices may occur using various communications ports that may be attached to one or more communications networks, such as the Internet or a local area network, or directly to a portable computing device such as a notebook computer. An interface may allow for receipt of data from input devices such as a keyboard, a mouse, a joystick, a touch screen, a remote control, a pointing device, a video input device, an audio input device, and the like.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of performing a tailgate calibration to control the speed of a tailgate for bale ejections from a baler, the tailgate moveable between a closed position and an open position, the method comprising:
 via one or more controllers coupled to the baler and configured to control movement of the tailgate, setting factors relating to flow rate and speed for opening and closing the tailgate to system nominal values;
 opening the tailgate by the one or more controllers based on an open command from an interface coupled to the one or more controllers until a stop command is received by the one or more controllers;
 closing the tailgate to the closed position by the one or more controllers based on a closed command from the interface; and
 storing an open time associated with a time taken to open the tailgate until the stop command is received and a closed time associated with a time taken to close the tailgate to the closed position.

2. The method of claim 1, wherein the factors relating to flow rate and speed for opening and closing the tailgate comprise one or more of: (i) a normal hydraulic flow rate for opening and a normal hydraulic flow rate for closing the tailgate; (ii) a baler tailgate opening speed factor and a baler tailgate closing speed factor; and (iii) a calibration hydraulic flow rate for opening and a calibration hydraulic flow rate for closing the tailgate.

3. The method of claim 1, further comprising, prior to opening the tailgate:
 via the one or more controllers, setting a tractor connected to the baler at operational levels; and
 verifying closure of the tailgate by the one or more controllers.

4. The method of claim 1, further comprising:
 initiating an open timer when the open command is received by the controllers; and
 stopping the open timer when the stop command is received by the controllers;
 wherein the one or more controllers determine the open time based on the open timer.

5. The method of claim 1, further comprising:
 initiating a closed timer when the closed command is received by the controllers; and
 stopping the closed timer when the tailgate reaches the closed position by the controllers;
 wherein the one or more controllers determine the closed time based on the closed timer.

6. The method of claim 1, further comprising, after the stop command is received:
 moving the tailgate to a fully open position by the controllers.

7. The method of claim 1, wherein the stop command is a command received from the interface.

8. The method of claim 1, wherein the stop command is based on a determination from the one or more controllers that the tailgate has reached a predetermined open position.

9. The method of claim 1, wherein the open time and the closed time are subsequently used by the one or more controllers to facilitate a bale ejection sequence.

10. A baler control system for a baler for performing a tailgate calibration to control the speed of a tailgate for bale ejections from the baler, the tailgate moveable between a closed position and an open position, the baler control system comprising:
 one or more controllers coupled to the baler, the one or more controllers configured to:
 control movement of the tailgate;
 establish factors relating to flow rate and speed for opening and closing the tailgate to system nominal values;
 open, based on an open command from an interface coupled to the one or more controllers, the tailgate until a stop command is received by the one or more controllers;
 close, based on a closed command from the interface, the tailgate to the closed position; and
 store, at a memory device associated with the one or more controllers, an open time associated with a time taken to open the tailgate until the stop command is received and a closed time associated with a time taken to close the tailgate to the closed position.

11. The baler control system of claim 10, wherein the factors relating to flow rate and speed for opening and closing the tailgate comprise one or more of: (i) a normal hydraulic flow rate for opening and a normal hydraulic flow rate for closing the tailgate; (ii) a baler tailgate opening speed factor and a baler tailgate closing speed factor; and (iii) a calibration hydraulic flow rate for opening and a calibration hydraulic flow rate for closing the tailgate.

12. The baler control system of claim 10, wherein the one or more controllers are further configured to, prior to opening the tailgate:
 set the tractor at operational levels; and
 verify the closure of the tailgate.

13. The baler control system of claim 10, wherein the one or more controllers are further configured to:
 initiate an open timer when the open command is received; and
 stop the open timer when the stop command is received;
 wherein the one or more controllers determine the open time based on the open timer.

14. The baler control system of claim 10, wherein the one or more controllers are further configured to:
 initiate a closed timer when the closed command is received; and
 stop the closed timer when the tailgate reaches the closed position;
 wherein the one or more controllers determine the closed time based on the closed timer.

15. The baler control system of claim 10, wherein the one or more controllers are further configured to, after the stop command is received:
 move the tailgate to a fully open position.

16. The baler control system of claim 10, wherein the stop command is a command received from the interface.

17. The baler control system of claim 10, wherein the stop command is based on a determination from the one or more controllers that the tailgate has reached a predetermined open position.

18. The baler control system of claim 10, wherein the open time and the closed time are subsequently used by the one or more controllers to facilitate a bale ejection sequence.

* * * * *